US011341438B2

(12) United States Patent
Ames, II

(10) Patent No.: US 11,341,438 B2
(45) Date of Patent: May 24, 2022

(54) PROVISIONING AND RECOMMENDER SYSTEMS AND METHODS FOR GENERATING PRODUCT-BASED RECOMMENDATIONS FOR GEOGRAPHICALLY DISTRIBUTED PHYSICAL STORES BASED ON MOBILE DEVICE MOVEMENT

(71) Applicant: The Procter & Gamble Company, Cincinnati, OH (US)

(72) Inventor: Daniel E Ames, II, Morrow, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 45 days.

(21) Appl. No.: 16/691,667

(22) Filed: Nov. 22, 2019

(65) Prior Publication Data
US 2021/0158245 A1     May 27, 2021

(51) Int. Cl.
*G06Q 10/00*     (2012.01)
*G06Q 10/06*     (2012.01)
(Continued)

(52) U.S. Cl.
CPC ......... *G06Q 10/06312* (2013.01); *G06N 5/04* (2013.01); *G06N 20/00* (2019.01);
(Continued)

(58) Field of Classification Search
None
See application file for complete search history.

(56) References Cited

U.S. PATENT DOCUMENTS 5,293,642 A * 3/1994 Lo .................. H04W 64/00
342/457
6,061,658 A    5/2000 Chou
(Continued)

OTHER PUBLICATIONS

James B. Pick et al. (Geographic information systems in business), ISBN 1-59140-400-2 (pbk.)—ISBN 1-59140-401-0 (ebook), 2005. (Year: 2005).*

(Continued)

*Primary Examiner* — Hafiz A Kassim
(74) *Attorney, Agent, or Firm* — Angela K Haughey; David M Weirich

(57) ABSTRACT

Product provisioning and recommender systems and methods are described for generating product-based recommendations for geographically distributed physical stores based on mobile device movement. In various embodiments, a server aggregates mobile device movement data originating from a plurality of mobile devices geographically distributed with respect to a physical store of a geographic trade area. A provisioning application (app) executing on the server and analyzing the mobile device movement data, assigns geographic region descriptors defining a geographical consumer region for each mobile device of the plurality of mobile devices. The provisioning app generates a network store graph model based on a set of regional probabilities and a set of trade area probabilities. The provisioning app implements the network store graph model to generate, and provide to physical store operator(s), product-based recommendations for a target geographic consumer region selected from the geographical consumer region(s) and in a proximity to the geographic trade area.

3 Claims, 6 Drawing Sheets

(51) Int. Cl.
G06Q 10/08 (2012.01)
G06Q 30/02 (2012.01)
G06N 20/00 (2019.01)
G06N 5/04 (2006.01)

(52) U.S. Cl.
CPC ..... *G06Q 10/06315* (2013.01); *G06Q 10/087* (2013.01); *G06Q 30/0201* (2013.01); *G06Q 30/0205* (2013.01)

(56) References Cited

U.S. PATENT DOCUMENTS

| | | | |
|---|---|---|---|
| 6,366,890 B1 | 4/2002 | Usrey | |
| 6,578,009 B1 | 6/2003 | Shinozaki | |
| 6,604,083 B1 | 8/2003 | Bailey | |
| 7,043,445 B2 | 5/2006 | Bailey | |
| 7,412,398 B1 | 8/2008 | Bailey | |
| 7,440,903 B2 | 10/2008 | Riley | |
| 7,483,842 B1 | 1/2009 | Fung | |
| 7,516,085 B2 | 4/2009 | Bailey | |
| 7,925,982 B2 | 4/2011 | Parker et al. | |
| 8,341,009 B1* | 12/2012 | Algranati | G06Q 30/0205 705/7.32 |
| 8,938,686 B1* | 1/2015 | Erenrich | G06Q 10/06395 715/771 |
| 9,165,304 B2* | 10/2015 | Weiss | G06Q 30/0205 |
| 9,786,161 B2* | 10/2017 | Filali | G08G 1/017 |
| 10,402,837 B2* | 9/2019 | Eswaran | G06Q 30/0202 |
| 10,834,190 B2* | 11/2020 | Rao | G06F 3/067 |
| 2001/0047293 A1 | 11/2001 | Waller | |
| 2003/0083925 A1 | 5/2003 | Weaver | |
| 2003/0105693 A1* | 6/2003 | Conkwright | G06Q 30/0254 705/35 |
| 2003/0130883 A1 | 7/2003 | Schroeder | |
| 2003/0171979 A1 | 9/2003 | Jenkins | |
| 2003/0200129 A1 | 10/2003 | Klaubauf | |
| 2003/0204453 A1 | 10/2003 | Kawamata | |
| 2004/0260599 A1 | 12/2004 | Ziegeie | |
| 2005/0021845 A1* | 1/2005 | Yasui | H04W 4/00 709/238 |
| 2006/0149634 A1 | 7/2006 | Pelegrin | |
| 2006/0242154 A1* | 10/2006 | Rawat | G06F 16/168 |
| 2007/0027745 A1 | 2/2007 | Ouimet | |
| 2007/0287473 A1* | 12/2007 | Dupray | H04W 4/029 455/456.1 |
| 2008/0208719 A1 | 8/2008 | Sharma | |
| 2008/0288327 A1 | 11/2008 | Watarai | |
| 2009/0029692 A1* | 1/2009 | Radermacher | H04L 67/306 455/418 |
| 2009/0030778 A1* | 1/2009 | Zapata | G06Q 30/0205 705/7.34 |
| 2009/0240647 A1* | 9/2009 | Green | G06N 7/005 706/52 |
| 2010/0076968 A1* | 3/2010 | Boyns | G06F 16/29 707/732 |
| 2010/0145814 A1* | 6/2010 | Meghani | G06Q 30/06 705/26.1 |
| 2010/0161376 A1* | 6/2010 | Spagnolo | G06Q 10/00 705/7.34 |
| 2011/0055290 A1* | 3/2011 | Li | G06F 16/29 707/807 |
| 2011/0066613 A1* | 3/2011 | Berkman | G06Q 50/01 707/734 |
| 2011/0070863 A1* | 3/2011 | Ma | H04M 1/72457 455/410 |
| 2013/0073388 A1* | 3/2013 | Heath | G06Q 30/02 705/14.53 |
| 2013/0178233 A1* | 7/2013 | McCoy | H04W 4/027 455/456.3 |
| 2013/0285855 A1* | 10/2013 | Dupray | G01S 5/0278 342/451 |
| 2014/0006129 A1* | 1/2014 | Heath | G06Q 30/0222 705/14.23 |
| 2014/0164109 A1* | 6/2014 | Chow | G06Q 30/0255 705/14.53 |
| 2014/0278768 A1* | 9/2014 | Zenor | G06Q 30/0202 705/7.31 |
| 2014/0365270 A1* | 12/2014 | Davis | G06Q 10/0635 705/7.28 |
| 2014/0370879 A1* | 12/2014 | Redding | H04M 3/42178 455/419 |
| 2015/0063164 A1* | 3/2015 | Hemphill | H04W 8/26 370/254 |
| 2015/0170175 A1* | 6/2015 | Zhang | H04M 15/44 705/7.33 |
| 2015/0356560 A1* | 12/2015 | Shastry | G06Q 20/38215 705/64 |
| 2016/0004751 A1* | 1/2016 | Lafuente Alvarez | G06F 16/24542 707/718 |
| 2016/0019465 A1* | 1/2016 | Milton | G06Q 30/0201 706/52 |
| 2016/0063597 A1* | 3/2016 | Goulart | G06Q 50/01 705/26.7 |
| 2016/0110728 A1* | 4/2016 | Garcia | G06Q 30/0201 705/7.29 |
| 2016/0117688 A1* | 4/2016 | Ghosh | H04W 4/027 705/7.29 |
| 2016/0253740 A1* | 9/2016 | Goulart | G06Q 90/20 705/26.8 |
| 2016/0307285 A1* | 10/2016 | Gallagher | G06F 16/29 |
| 2016/0373906 A1* | 12/2016 | Khan | H04W 4/18 |
| 2017/0064515 A1* | 3/2017 | Heikkila | H04W 4/021 |
| 2017/0091795 A1 | 3/2017 | Mansour | |
| 2017/0286980 A1 | 10/2017 | Winters | |
| 2018/0121939 A1* | 5/2018 | Eswaran | G06Q 30/0204 |
| 2018/0268438 A1* | 9/2018 | Shariff | G06Q 30/0202 |
| 2018/0344612 A1 | 12/2018 | Zhao et al. | |
| 2019/0090090 A1* | 3/2019 | Doyal | G06F 16/29 |
| 2019/0164180 A1* | 5/2019 | Koell | G06Q 30/0202 |
| 2019/0266404 A1* | 8/2019 | Spivack | G06V 20/35 |
| 2019/0303807 A1* | 10/2019 | Gueye | G06Q 10/02 |
| 2019/0385212 A1* | 12/2019 | DeLuca | G06Q 30/0631 |
| 2020/0211053 A1* | 7/2020 | Shishkin | G06Q 30/0256 |
| 2021/0090750 A1* | 3/2021 | Sadilek | G16H 10/65 |

OTHER PUBLICATIONS

Trishna Jadhav Prof. S. S. Banait (Neighborhood Integrated Matrix Factorization for Temporal Prediction, International Conference on "Emerging Trends in Computer Engineering, Science and Information Technology"—2015). (Year: 2015).*

Masab Ahmad, Farrukh Hijaz, Qingchuan Shi, Omer Khan (A Benchmark Suite for Multithreaded Graph Algorithms Executing on Futuristic Multicores, 2015 IEEE International Symposium on Workload Characterization). (Year: 2015).*

Jonggeol Na, Youngsub Lim, and Chonghun Han (A modified Direct algorithm for hidden constraints in an LNG process optimization, Energy 126 (2017) 488-500). (Year: 2017).*

Ela Dramowicz (Retail Trade Area Analysis Using the Huff Model, Jul. 3, 2005). (Year: 2005).*

Griffith, Daniel A., "A Generalized Huff Model," Geographical Analysis, vol. 14, No. 2, Apr. 1982, pp. 135-144). (Year: 1982).*

Huff, David et al., "Calibrating the Huff Model Using ArcGIS Business Analyst," an ESRI.RTM. White Paper, Sep. 2008). (Year: 2008).*

Thomas Wuerzer and Susan G. Mason (Retail gravitation and economic impact: A market-driven analytical framework for bike-share station location analysis in the United States, International Journal Of Sustainable Transportation 2016, vol. 10, No. 3, 247-259). (Year: 2016).*

Yan Qu and Jun Zhang (Trade Area Analysis using User Generated Mobile Location Data, WWW 2013, May 13-17, 2013, Rio de Janiero, Brazil. ACM 978-1-4503-2035-1 /13/05). (Year: 2013).*

Kevin Russell Krivacsy (Retail Market Area Analysis Using a Transportation Network with Consideration of Population, B.S., Kennesaw State University, 2006). (Year: 2006).*

(56) References Cited

OTHER PUBLICATIONS

Xin Chen, Fangcao Xu, Weili Wang, Yikang Du, and Miaoyi Li (Geographic Big Data's Applications in Retailing Business Market, Springer International Publishing AG 2018). (Year: 2018).*

Ida Kristofferssona, Andrew Daly, Staffan Algers (Modelling the attraction of travel to shopping destinations in large-scale modelling, Transport Policy 68 (2018) 52-62). (Year: 2018).*

Borin, Norm et al., A model for determining retail product category assortment and shelf space allocation Decision Sciences, May/Jun. 1994, vol. 25, No. 3.

Applebaum, William, Methods for Determining Store Trade Areas, Market Penetration and Potential Sales Journal of Marketing Research, 1966, vol. 3, No. 2.

Freehling, John, Using Drive Times to Construct Trading Areas GIS in Business Conference Proceedings, 1993.

Brunner, James A. et al., The Influence of Driving Time upon Shopping Center Preference Journal of Marketing, vol. 3,2 No. 2, Apr. 1968.

O'Malley, Lisa et al., Retailing applications of geodemographics: a preliminary investigation Marketing Intelligence & Planning, vol. 13, No. 2, 1995.

Cohen, Eric, Miles, Minutes & Custom Markets: Defining your trade area involves more than just drawing circles on a map American Demographics, Jul./Aug. 1996.

Bultez, Alain et al., S.H.A.R.P.: Shelf Allocation for Retailers Profit Marketing Science, vol. 7, No. 3, Summer 1988.

Myles, Albert E., Trading Area Analysis Mississippi State University, Sep. 9, 2016.

Hibbert, James D. et al., Prediction of Shopping Behavior Using a Huff Model Within a GIS Framework Healthy Eating in Content, Mar. 18, 2011.

Connor, Jessica et al., Using ArcGIS Business Analyst ESRI, 2008.

Shankar, Venkatesh et al., An Empirical Analysis of Determinants of Retailer Pricing Strategy Marketing Science, vol. 23, No. 1, Winter 2004.

Dramowicz, Ela, Retail Trade Analysis Using the Huff Model Directions Magazine, Jul. 3, 2005.

* cited by examiner

| Stage | Attractiveness exponent β | Distance exponent α | Prob. Cutoff | TA Test | TA sz |
|---|---|---|---|---|---|
| BG TA | 1.3 | 2 | 1.0% | | |
| Store TA | 1 | 1 | 0.5% | | |
| Pass 2 Large TA | 1 | 1 | 0.5% | <4 BG or pop < 5000 | 20 mi radial |
| Pass 3 Small TA | 1 | 1 | 1.0% | <4 BG | 3 mi radial |
| Pass 4 Very Large TA | 1 | 1 | Top 10 | <4 BG | 30 mi radial |

400

402 — Stage
404 — Attractiveness exponent
406 — Distance exponent
408 — Prob. Cutoff
410 — TA Test
412 — TA sz 420 — BG TA
422 — Store TA
424 — Pass 2 Large TA
426 — Pass 3 Small TA
428 — Pass 4 Very Large TA (Model Parameters)

FIG. 4

| Channel | Sales | | Price | | Distribution | | Innovation |
|---|---|---|---|---|---|---|---|
| | Monthly | YoY gr | Low | YoY gr | Breadth - Cat Ct | Depth - upc/cat | % sales from new prods |
| Mass | X | X | X | X | X | X | |
| Food | | X | X | X | X | | |
| Club | X | X | | X | | | X |
| Drug | | X | X | X | X | X | X |
| Dollar | | X | X | X | | | X |
| Normalize By | | | | | | | Weight by |

(Attractiveness Matrix)

FIG. 5

PROVISIONING AND RECOMMENDER SYSTEMS AND METHODS FOR GENERATING PRODUCT-BASED RECOMMENDATIONS FOR GEOGRAPHICALLY DISTRIBUTED PHYSICAL STORES BASED ON MOBILE DEVICE MOVEMENT

FIELD OF THE DISCLOSURE

The present disclosure generally relates to product provisioning and recommender systems and methods, and more particularly to, provisioning and recommender systems and methods for generating product-based recommendations for geographically distributed physical stores based on mobile device movement.

BACKGROUND

Historically, consumer packaged goods (CPG) manufacturers have had a limited understanding of geographic demand for their products. For example, such understanding was confined to a specific retailer location, or, on the other hand, an overbroad national or county level. Such limitations were reinforced by a lack of knowledge as to consumer or regional areas and related differences, each of which can vary disparately across wide areas of the United States. In some instances, these differences can occur within close proximities, and for different reasons.

These limitations create a problem for CPG manufacturers in tracking, provisioning, recommending, or otherwise geographically distributing products, across the various disparate areas, in an efficient and/or effective manner. In an era of "big data," no system or method has efficiently and/or effectively provided a manner to address this problem.

For the foregoing reasons, there is a need for provisioning and recommender systems and methods for generating product-based recommendations for geographically distributed physical stores based on mobile device movement.

BRIEF SUMMARY

Generally, the provisioning and recommender systems and methods described herein provide an automated platform to generate product-based recommendations based on mobile device movement data originating from mobile devices moving through various geographic trade regions. Accordingly, the disclosed systems and methods provide a unique data-driven solution, based on mobile device data, allowing manufacturers to understand or track CPG demand at very discrete levels, such as at a Census Block Group or "Neighborhood" level. For example, in various embodiments described herein, the provisioning and recommender systems and methods provide an automated platform that may analyze store visit data as determined by mobile device movement data for approximately 55 million mobile devices over approximately 40 million physical store visits per day. This "big data," data-driven approach may allow manufacturers, or physical store operators, to make product-based recommendations for specific, target neighborhoods. The disclosed systems and methods also identifies what products to develop or produce and/or which certain characteristics to include for new product development based on geographic fit and/or demand. The disclosed systems and methods generally assist manufacturers optimize product distribution, retail, and/or marketing programs to target members of specific consumer regions with in-demand product for those regions.

More specifically, as described herein in various embodiments, a product provisioning and recommender system or platform is configured to generate product-based recommendations for geographically distributed physical stores based on mobile device movement. The product provisioning and recommender system may include a server configured to aggregate mobile device movement data originating from a plurality of mobile devices geographically distributed with respect to a physical store of a geographic trade area. In addition, the product provisioning and recommender system may include a provisioning application (app), executing on the server, and configured to analyze the mobile device movement data to assign, based on the mobile device movement data, a geographic region descriptor for each mobile device of the plurality of mobile devices. Each geographic region descriptor may define a geographical consumer region selected from one or more geographical consumer regions in a proximity to the geographic trade area. In addition, the provisioning app may determine, based on the geographical region descriptors of the plurality of mobile devices and the geographic trade area, a set of regional probabilities predicting a first likelihood of members of the one or more geographical consumer regions to travel to the physical store. The provisioning app may further determine, using the set of regional probabilities as input, a set of trade area probabilities predicting a second likelihood of members of the one or more geographical consumer regions to travel to the physical store. In addition, the provisioning app may generate, based on the set of regional probabilities and the set of trade area probabilities, a network store graph model allocated according to the one or more geographical consumer regions. The provisioning app may be configured to generate, based on the network store graph model, a product-based recommendation for a target geographic consumer region selected from the one or more geographical consumer regions and in a proximity to the geographic trade area. In various embodiments, the product-based recommendation is provided to an operator of the physical store or a product manufacturer.

In addition, as described in various embodiments herein, a product provisioning and recommender method is disclosed for generating product-based recommendations for geographically distributed physical stores based on mobile device movement. The product provisioning and recommender method may include aggregating, by a server, mobile device movement data originating from a plurality of mobile devices geographically distributed with respect to a physical store of a geographic trade area. The product provisioning and recommender method may further include assigning, by a provisioning application (app) executing on the server and analyzing the mobile device movement data, a geographic region descriptor for each mobile device of the plurality of mobile devices. Each geographic region descriptor may define a geographical consumer region selected from one or more geographical consumer regions in a proximity to the geographic trade area. The product provisioning and recommender method may further include determining, by the provisioning app based on the geographical region descriptors of the plurality of mobile devices and the geographic trade area, a set of regional probabilities predicting a first likelihood of members of the one or more geographical consumer regions to travel to the physical store. The product provisioning and recommender method may further include determining, by the provisioning app using the set of regional probabilities as input, a set of trade area probabilities predicting a second likelihood of members of the one or more geographical consumer regions to travel to the physical store. The product provisioning and recommender method may further include generating, by the provisioning app based on the set of regional probabilities and the set of trade area probabilities, a network store graph model allocated according to the one or more geographical consumer regions. The product provisioning and recommender method may further include generating, by the provisioning app based on the network store graph model, a product-based recommendation for a target geographic consumer region selected from the one or more geographical consumer regions and in a proximity to the geographic trade area. In various embodiments, the product-based recommendation may then be provided to an operator of the physical store or a product manufacturer.

In addition, as described in various embodiments herein, a tangible, non-transitory computer-readable medium storing instructions is disclosed for generating product-based recommendations for geographically distributed physical stores based on mobile device movement. The instructions, when executed by one or more processors of a server, may cause the one or more processors of the server to aggregate mobile device movement data originating from a plurality of mobile devices geographically distributed with respect to a physical store of a geographic trade area. The instructions may further cause the server, via a provisioning app executing on the server and analyzing the mobile device movement data, to assign a geographic region descriptor for each mobile device of the plurality of mobile devices. In such embodiments, each geographic region descriptor may define a geographical consumer region selected from one or more geographical consumer regions in a proximity to the geographic trade area. The instructions may further cause the server to determine, by the provisioning app based on the geographical region descriptors of the plurality of mobile devices and the geographic trade area, a set of regional probabilities predicting a first likelihood of members of the one or more geographical consumer regions to travel to the physical store. The instructions may further cause the server to determine, by the provisioning app using the set of regional probabilities as input, a set of trade area probabilities predicting a second likelihood of members of the one or more geographical consumer regions to travel to the physical store. The instructions may further cause the server to generate, by the provisioning app based on the set of regional probabilities and the set of trade area probabilities, a network store graph model allocated according to the one or more geographical consumer regions. The instructions may further cause the server to generate, by the provisioning app based on the network store graph model, a product-based recommendation for a target geographic consumer region selected from the one or more geographical consumer regions and in a proximity to the geographic trade area. In various embodiments, the product-based recommendation may be provided to an operator of the physical store or a product manufacturer.

In accordance with the above, and with the disclosure herein, the present disclosure includes improvements in computer functionality or in improvements to other technologies at least because, e.g., the disclosed provisioning server(s) and/or provisioning app(s) may access a pre-defined network store graph model(s), as described herein, where such access may be multi-directional from the geographical consumer region level or perspective or from the geographical trade area level or perspective. In this way, the provisioning server(s) and/or provisioning app(s) may flexibly, and efficiently, access the network store graph model, as described herein, which improves the performance, speed, and efficiency of the provisioning server(s) because the provisioning server(s) are freed from re-computing, on-the-fly the multi-directional graph, which therefore avoids reusing memory and processor resources, when providing big data computations (e.g., such as required for the product-based recommendations, as described herein) from multiple perspectives or data entry points. That is, the present disclosure describes improvements in the functioning of the computer itself or "any other technology or technical field" because provisioning server(s) are enhanced by the network store graph model(s). This improves over the prior art at least because prior art systems were limited in that they do not provide multi-directional graph access and/or because they required re-computation. For example, in various embodiments, a network store graph model may be stored or represented in memory as a light-weight and/or compiled data structure, which improves access and efficiency of provisioning server(s) and/or provisioning app through its pre-defined, accessible graph. This can improve the performance of the provisioning server(s) and/or provisioning app as the provisioning server(s) and/or provisioning app would not need to look-up, for each access, relationships already determined and embodied in the network store graph model.

In addition, a provisioning app, may determine, from the mobile device movement data, that certain geographical consumer region(s) and/or a geographical trade area(s) are associated with little or no trips. In such embodiments, server(s) and/or provisioning app may implement an attractiveness algorithm or matrix to enhance the accuracy of the network store graph model as executing on provisioning server(s) described herein.

Still further, in some embodiments, the provisioning app may be replicated across provisioning server(s), and may operate in parallel or redundant fashion to improve the speed and/or efficiently in which the provision app and/or servers analyze the millions of records of data, including, for example, the millions of mobile device data records or other types of data described herein. These improvements allow the provisioning server(s) to scale even with the ingestion and/or aggregation of millions of incoming, and in some embodiments, real-time mobile device data.

In addition, the present disclosure includes effecting a transformation or reduction of a particular article to a different state or thing, e.g., analyzing mobile device movement data to generate a network store graph model and/or to generate a product-based recommendation for a target geographic consumer region based on the network store graph model.

Further, the present disclosure includes specific limitations and features other than what is well-understood, routine, conventional activity in the field, or adding unconventional steps that confine the claim to a particular useful application, e.g., analyzing mobile device movement data to generate a network store graph model and/or to generate a product-based recommendation for a target geographic consumer region based on the network store graph model.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 4 illustrates a representation of an example set of model parameters for configuring the network store graph model of FIG. 2B in accordance with various embodiments disclosed herein.

FIG. 5 illustrates a representation of an example attractiveness matrix for configuring the network store graph model of FIG. 2B in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

Figure 1:
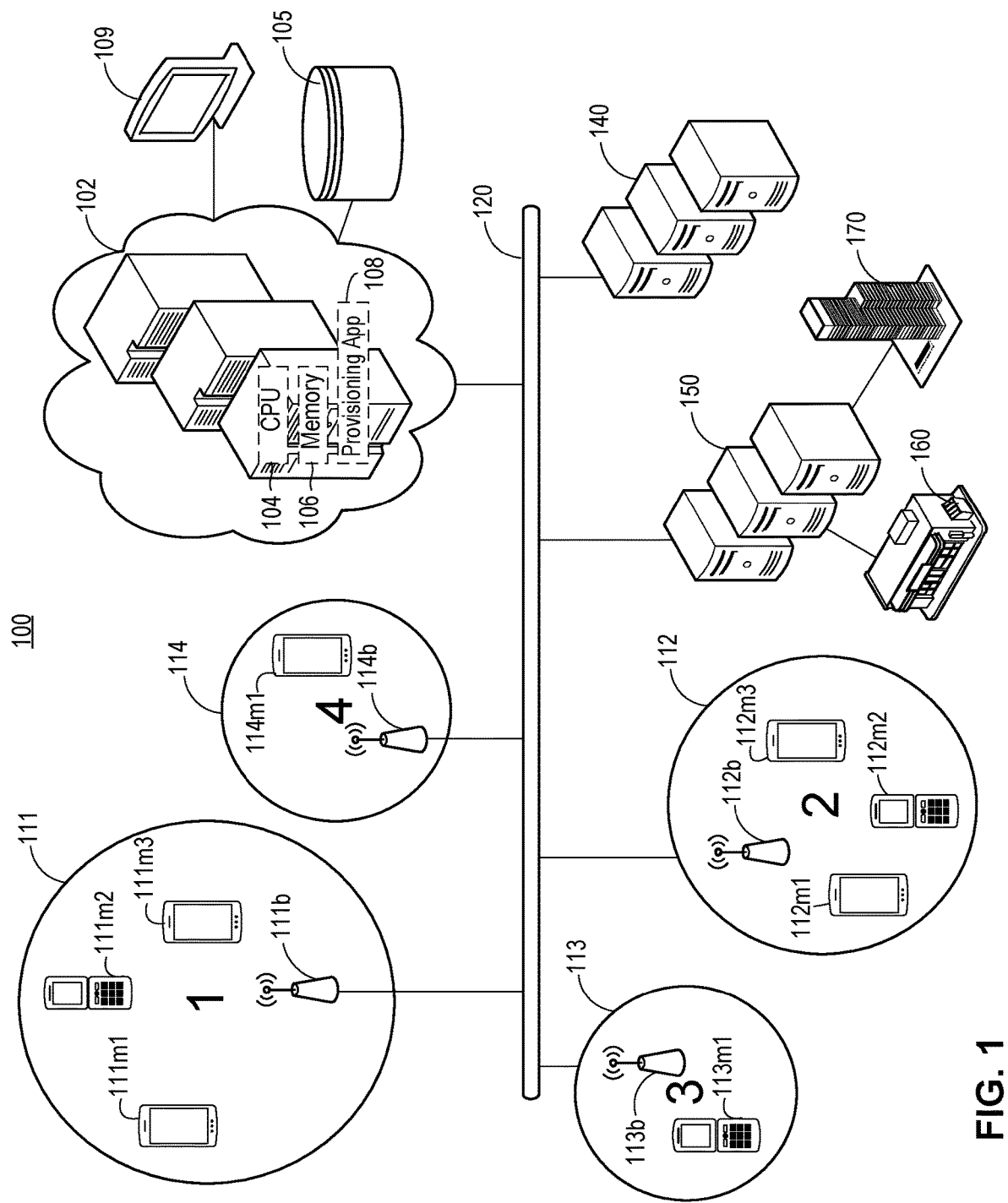
FIG. 1 illustrates an example product provisioning and recommender system depicting mobile devices traveling within geographic trade areas of geographically distributed physical stores in accordance with various embodiments disclosed herein.

FIG. 1 illustrates an example product provisioning and recommender system 100 depicting mobile devices traveling within geographic trade areas of geographically distributed physical stores in accordance with various embodiments disclosed herein. In the example embodiment of FIG. 1, product provisioning and recommender system 100 includes server(s) 102, which may be referred to herein as "provisioning server(s)," and which may comprise one or more computer servers. In various embodiments, server(s) 102 comprise multiple servers, which may comprise multiple, redundant, or replicated servers as part of a server farm. In still further embodiments, server(s) 102 are implemented as cloud-based servers. For example, server(s) 102 may be a cloud-based platform such as MICROSOFT AZURE, AMAZON AWS, or the like.

Server(s) 102 may include one or more processor(s) 104 as well as one or more computer memories 106. The memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memories 106 may store an operating system (OS) (e.g., Microsoft Windows, Linux, Unix, etc.) capable of facilitating the functionalities, apps, methods, or other software as discussed herein. The memories 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the machine learning component and/or the provisioning application, where each are configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

The processor(s) 104 may interface with the memory 106 via the computer bus to execute the operating system (OS). The processor(s) 104 may also interface with the memory 106 via the computer bus to create, read, update, delete, or otherwise access or interact with the data stored in the memories 106 and/or the database 105 (e.g., a relational database, such as Orcale, DB2, MySQL, or a NoSQL based database, such as MongoDB). The data stored in the memories 106 and/or the database 105 may include all or part of any of the data or information described herein, including, for example, the one or more search requests, the one or more transaction details, and the profile information of the user.

The server(s) 102 may further include a communication component configured to communicate (e.g., send and receive) data via one or more external/network port(s) to one or more networks or local terminals, such as computer network 120 and/or terminal 109 (for rendering or visualizing) as described herein. In some embodiments, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein. According to some embodiments, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via or attached to server(s) 102 or may be indirectly accessible via or attached to terminal 109. According to some embodiments, an administrator or operator may access the server 102 via terminal 109 to review information, make changes, input training data, and/or perform other functions.

As described above herein, in some embodiments, server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, or application, (e.g., the provisioning application) in accordance with some embodiments may include a computer usable storage medium, or tangible, non-transitory computer-readable medium (e.g., standard random access memory (RAM), an optical disc, a universal serial bus (USB) drive, or the like) having computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, Actionscript, Javascript, HTML, CSS, XML, etc.).

In the example embodiment of FIG. 1, provisioning server(s) 102 are communicatively connected, via computer network 120 and base stations 111$b$, 112$b$, 113$b$, and 114$b$ to a plurality of mobile devices 111$m$1-111$m$3, 112$m$1-112$m$3, 113$m$1, and 114$m$1. Computer network 120 may comprise a packet based network operable to transmit computer data packets among the various devices and servers described herein. For example, computer network 120 may consist of any one or more of Ethernet based network, a private network, a local area network (LAN), and/or a wide area network (WAN), such as the Internet. In addition, in some embodiments, computer network 120 may comprise cellular or mobile networks to facilitate data packet traffic (e.g., mobile device movement data) to and from base stations 111$b$, 112$b$, 113$b$, and 114$b$. Base stations 111$b$, 112$b$, 113$b$, and 114$b$ may comprise cellular towers or access points implementing any one or more cellular or mobile device standards, including, for example, any of GSM, UMTS, CDMA, NMT, LTE, 5G NR, or the like.

As shown in FIG. 1, provisioning server(s) 102 are configured to ingest or aggregate mobile device movement data originating from a plurality of mobile devices (e.g., mobile devices 111$m$1-111$m$3, 112$m$1-112$m$3, 113$m$1, and 114$m$1). Each of the mobile devices 111$m$1-111$m$3, 112$m$1-112$m$3, 113$m$1, and 114$m$1 are geographically distributed with respect to a physical store of a geographic trade area. For example, each of mobile devices 111$m$1, 111$m$2, 111$m$3 are members of, travel within, or otherwise distributed within geographic trade area 111. Geographic trade area 111 represents a region or area corresponding to physical store (e.g., represented by physical store 160) positioned or located within geographic trade area 111. Each of mobile devices 111$m$1, 111$m$2, 111$m$3 communicate with computer network 120 via base station 111$b$ (or other base stations within or near geographic trade area 111). In this way, each of mobile devices 111$m$1, 111$m$2, 111$m$3 may generate mobile device movement data, defining location and/or tracking data (e.g., such as GPS data) of the mobile devices moving or traveling within geographic trade area 111. For example, the mobile device movement data may include distances, drive times, number of store visits (e.g., to physical store 160 positioned within geographic trade area 111). Mobile device movement data may further include information about the consumer or member operating the mobile device (e.g., 111$m$1) such as user information (e.g., demographics, names, addresses, etc.). Such mobile device movement data may be transmitted to provisioning server(s) 102 for ingestion or aggregation, for example, in server(s) 102 memory 106 and/or database 105.

Similarly, each of mobile devices 112$m$1, 112$m$2, 113$m$3 are members of, travel within, or otherwise distributed within geographic trade area 112. Geographic trade area 112 represents a region or area corresponding to a physical store (e.g., represented by physical store 160) positioned or located within geographic trade area 112. Each of mobile devices 112$m$1, 112$m$2, 112$m$3 communicate with computer network 120 via base station 112$b$ (or other base stations within or near geographic trade area 112). Each of mobile devices 112$m$1, 112$m$2, 112$m$3 may generate mobile device movement data, defining location and/or tracking data (e.g., such as GPS data) of the mobile devices moving or traveling within geographic trade area 112. For example, the mobile device movement data may include distances, drive times, number of store visits (e.g., to physical store 160 positioned within geographic trade area 112). Mobile device movement data may further include information about the consumer or member operating the mobile device (e.g., 112$m$1) such as user information (e.g., demographics, names, addresses, etc.). Such mobile device movement data may be transmitted to provisioning server(s) 102 for ingestion or aggregation, for example, in server(s) 102 memory 106 and/or database 105.

In addition, mobile device 113$m$1 is a member of, travels within, or is otherwise distributed within geographic trade area 113. Geographic trade area 113 represents a region or area of corresponding to physical store (e.g., represented by physical store 160) positioned or located within geographic trade area 113. Mobile device 113$m$1 communicates with computer network 120 via base station 113$b$ (or other base stations within or near geographic trade area 113). Mobile devices 113$m$1 may generate mobile device movement data, defining location and/or tracking data (e.g., such as GPS data) of the mobile device moving or traveling within geographic trade area 113. For example, the mobile device movement data may include distances, drive times, number of store visits (e.g., to physical store 160 positioned within geographic trade area 113). Mobile device movement data may further include information about the consumer or member operating the mobile device (e.g., 113m1) such as user information (e.g., demographics, names, addresses, etc.). Such mobile device movement data may be transmitted to provisioning server(s) 102 for ingestion or aggregation, for example, in server(s) 102 memory 106 and/or database 105.

Further, mobile device 114m1 is a member of, travels within, or is otherwise distributed within geographic trade area 114. Geographic trade area 114 represents a region or area of corresponding to physical store (e.g., represented by physical store 160) positioned or located within geographic trade area 114. Mobile device 114m1 communicates with computer network 120 via base station 114b (or other base stations within or near geographic trade area 114). Mobile devices 114m1 may generate mobile device movement data, defining location and/or tracking data (e.g., such as GPS data) of the mobile device moving or traveling within geographic trade area 114. For example, the mobile device movement data may include distances, drive times, number of store visits (e.g., to physical store 160 positioned within geographic trade area 114). Mobile device movement data may further include information about the consumer or member operating the mobile device (e.g., 114m1) such as user information (e.g., demographics, names, addresses, etc.). Such mobile device movement data may be transmitted to provisioning server(s) 102 for ingestion or aggregation, for example, in server(s) 102 memory 106 and/or database 105.

It is to be understood that each of geographic trade areas 111 to 114, and their respective mobile devices and physical stores, are provided as but one embodiment, and that the provisioning and recommender systems and methods described herein may communicate, network with, or otherwise interface with a greater or fewer number of geographic trade areas 111 to 114, and their respective mobile devices and physical stores as described herein.

In various embodiments, provisioning server(s) 102 may receive mobile device movement data, over computer network 120, directly or indirectly from the mobile devices (e.g., mobile devices 111m1-111m3, 112m1-112m3, 113m1, and 114m1). In other embodiments, the mobile device data may be received indirectly from a third-party service, e.g., from a third-party application programming interface (API), server, and/or data source, etc., executing on third-party servers 140. Third-party servers 140 may include one or more processors and memories for storing mobile device data (e.g., mobile device movement data), which may be transmitted to provisioning server(s) 102 for ingestion or aggregation as described herein.

In various embodiments, provisioning server(s) 102 may receive, ingest, and/or aggregate various types of data to be analyzed, as described herein, e.g., for generating product-based recommendations. The types of data may be received from various sources described herein, including, e.g., mobile devices 111m1-111m3, 112m1-112m3, 113m1, and 114m1 and/or third-party servers 140. In several embodiments, the types of data may include, for example, any one or more of: (a) weekly point-of-sales data, e.g., for approximately 60,000 physical stores (e.g., physical store 160) and over 100,000 CPG products; (b) mobile device store visit data, e.g., for approximately 55 million mobile devices and 40 million consumer visits per day; (c) demographic, psychographic, behavioral, and location data e.g., for 250 million consumers across more than 217 million geographical consumer regions (e.g., neighborhoods); and/or (d) location and other attributes (e.g., products or product inventory), e.g., for 60 thousand physical retailer stores (e.g., physical store 160). Such data base be stored in memory 106 and/or database 105. Provisioning server(s) 102 may pre-process, combine, and/or analyze such data, for example using provisioning app 108 as described herein, to determine or predict which physical stores a geographic consumer region (e.g., neighborhood or members thereof) will visit (e.g., physical store 160), a geographic trading area (e.g., geographic trade area 111) for a physical store, and/or the sales allocation (demand) for each product in each geographic consumer region (e.g., neighborhood).

In various embodiments, provisioning server(s) 102, executing provisioning app 108 and/or a network store graph model, may transmit, over computer network 120, product-based recommendations as described herein. More specifically, in various embodiments, a provisioning application (app) 108, executing on server(s) 102, is configured to analyze mobile device movement data, e.g., originating from mobile devices 111m1-111m3, 112m1-112m3, 113m1, and 114m1. In some embodiments, provisioning app 108 may be replicated across server(s) 102, and may operate in parallel or redundant fashion to improve the speed and/or efficiency in which the provision app and/or servers analyze the millions of records of data, including, for example, the millions of mobile device data records or other types of data as described herein.

Figure 3:
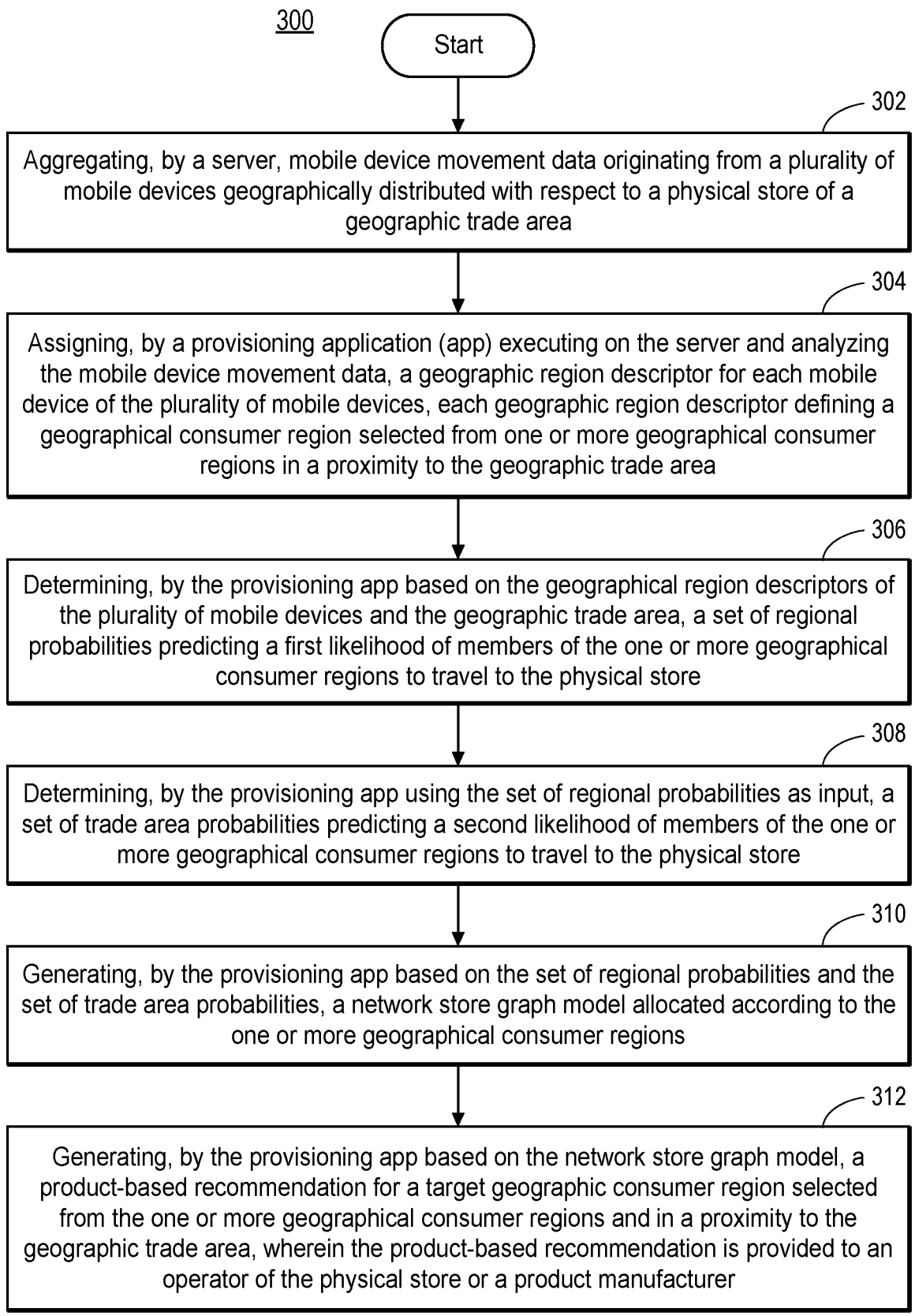
FIG. 3 illustrates a flow diagram or algorithm of an example product provisioning and recommender method for generating product-based recommendations for geographically distributed physical stores based on mobile device movement in accordance with various embodiments disclosed herein.

For example, flow diagram or algorithm of the method of 300 of FIG. 3, as described herein, may be executed by, or as part of, a provisioning app 108. Provisioning app 108 may be software implemented in a programming language such as Java, C#, Ruby, etc., and compiled to execute on the one or more processors 104 and/or server(s) 102. For example, in one embodiment, provisioning app 108 may include a "while" loop executing to perform one or more portions of method 300 upon receipt of data described herein, including mobile device data (e.g., mobile device movement data) from mobile devices 111m1-111m3, 112m1-112m3, 113m1, and 114m1 and/or third-party server(s) 140. In such embodiments, receipt of such data would result in a "true" condition or state that would trigger the while loop to execute the one or more portions of algorithm 400. In still further embodiments, the provisioning app 108 may include one or more event listeners, such as a listener function programmed within the provisioning app 108, where the listener function would receive, as parameter(s), the data from mobile devices 111m1-111m3, 112m1-112m3, 113m1, and 114m1 and/or third-party server(s) 140 as the mobile devices move within respective geographical trade areas (e.g., geographical trade area 111). In this way, the mobile devices 111m1-111m3, 112m1-112m3, 113m1, and 114m1 and/or third-party server(s) 140 would "push" data to the listener function which would execute method 300 using mobile device or other data as described herein.

Figure 2A:
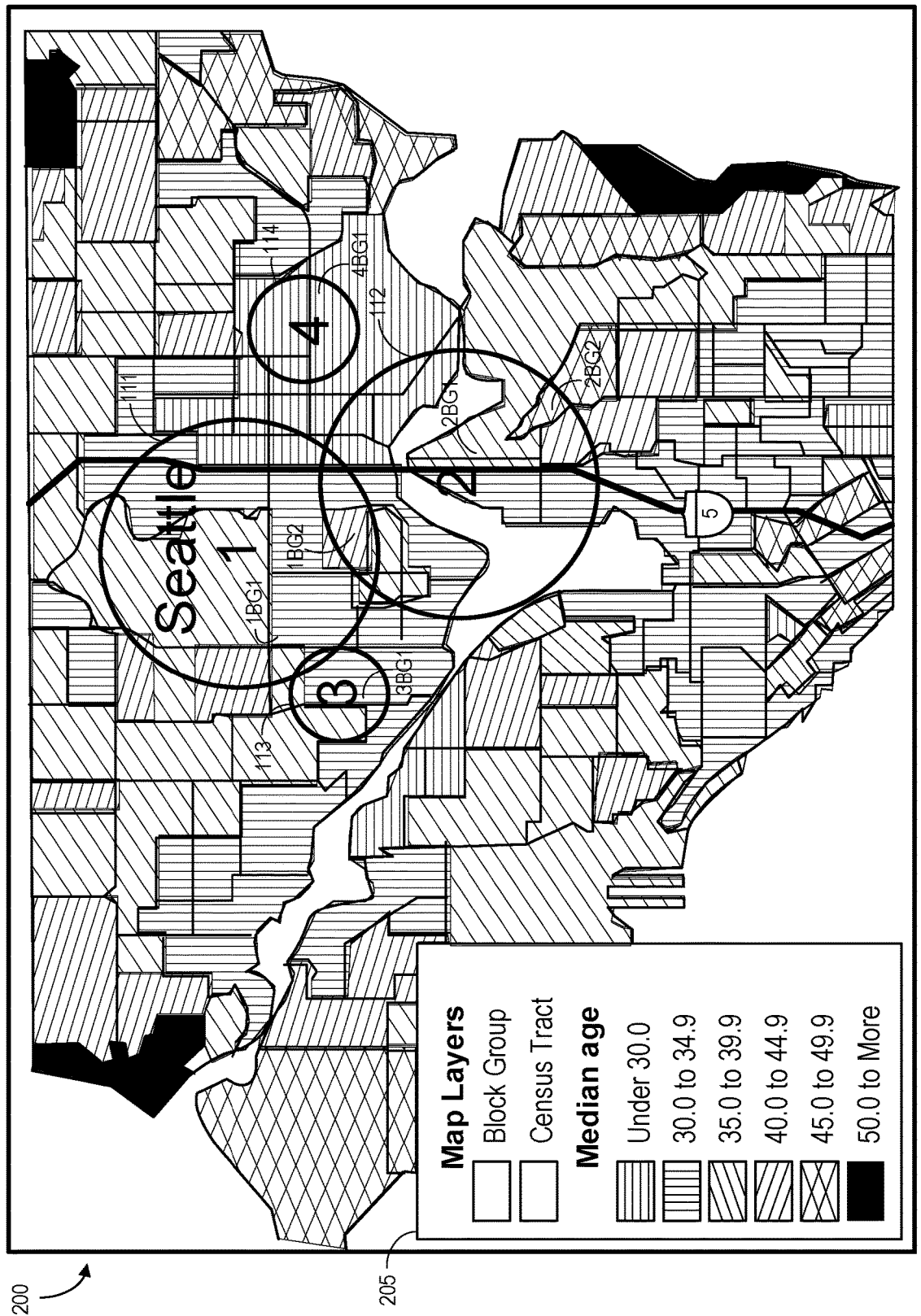
FIG. 2A illustrates a map view of the geographic trade areas of FIG. 1 distributed across example geographical consumer regions in accordance with various embodiments disclosed herein.
Figure 2B:
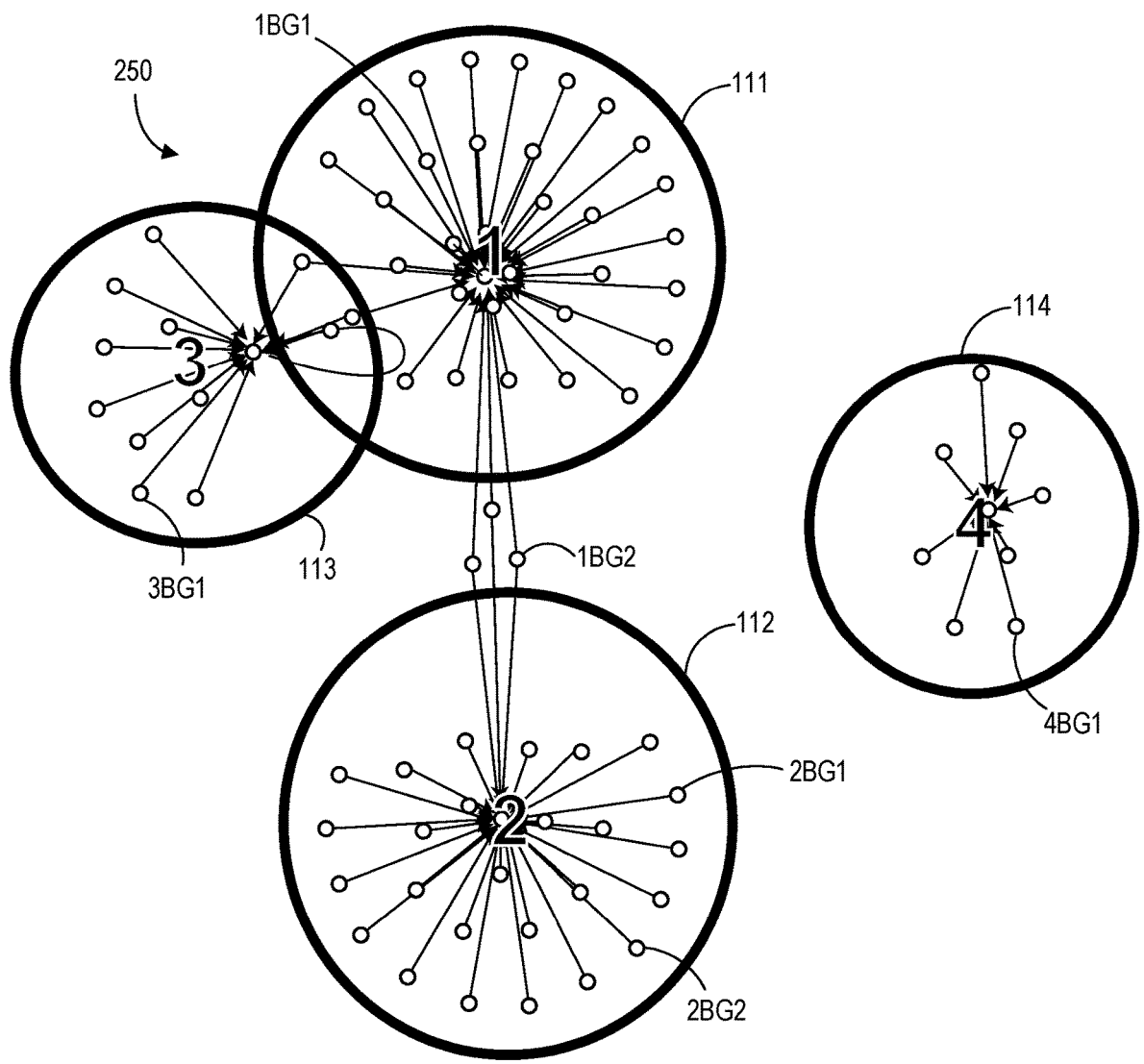
FIG. 2B illustrates a visualization or rendering of a network store graph model representing the geographic trade areas in relation to geographical consumer regions of FIGS. 1 and 2, and in accordance with various embodiments disclosed herein.

In various embodiments, provisioning app 108 (e.g., based on a network store graph model 250 as described for FIG. 2B) may generate a product-based recommendation, which may include, for example, a product development recommendation for a particular geographical consumer region as determined by the provisioning server(s) 102, and/or provisioning app 108. In various embodiments, the product-based recommendation(s) may be transmitted or otherwise provided, e.g., via computer network 120, to an operator of a physical store (e.g., physical store 160) or a product manufacturer (e.g., product manufacturer 170). For example, as shown for FIG. 1, server(s) 150 may comprise one or more processors and/or memories and may be communicatively coupled via computer network 120. In one embodiment, server(s) 150 may be accessible or other controlled by an operator of physical store 160, such that the operator of physical store 160 may receive electronic and/or networked product-based recommendation(s) regarding physical store 160 (e.g., such as stocking, inventory, and/or marketing purposes). In another embodiment, server(s) 150 may be accessible or other controlled by product manufacturer 170, such that the product manufacturer 170 may receive electronic and/or networked product-based recommendation(s) regarding specific products (e.g., for product development purposes).

FIG. 2A illustrates a map view 200 of the geographic trade areas 111-114 of FIG. 1 distributed across example geographical consumer regions, including, e.g., 1BG1, 1BG2, 2BG1, 2BG2, 3BG1, and 4BG1, in accordance with various embodiments disclosed herein. In the embodiment of FIG. 2A, geographical consumer regions (e.g., including e.g., 1BG1, 1BG2, 2BG1, 2BG2, 3BG1, and 4BG1) are depicted covering areas of the state of Washington, including areas of Seattle. The embodiment of FIG. 2A represents, as shown via data type key 205, the geographical consumer regions as block groups located within census tracks. Each block group is associated with demographic information (e.g., median age) per data type key 205. In various embodiments, such information may be ingested or aggregated by provisioning servers(s) 102 as described herein. While map view 200 only shows one view or area (e.g., the area of Seattle) with its respective geographical consumer regions and a subject of data (e.g., of data type key), it is to be understood that the disclosure herein may apply to various views, in any area of the United States, or abroad, and mapped against the same or different data types or regions, such as any of the data types or regions described herein.

As illustrated by FIG. 2A, geographic trade areas (e.g., geographic trade areas 111-114 as described herein for FIG. 1) overlap, include, or are otherwise associated with certain geographical consumer regions, including, e.g., 1BG1, 1BG2, 2BG1, 2BG2, 3BG1, and 4BG1. For example, geographic trade area 111 overlaps, includes, or is otherwise associated with geographical consumer regions 1BG1 and 1BG2 (where "BG" indicates a block group of map view 200). Similarly, geographic trade area 112 overlaps, includes, or is otherwise associated with geographical consumer regions 2BG1 and 2BG2. Further, geographic trade areas 113 and 114 overlap, include, or are otherwise associated with geographical consumer regions 3BG1 and 4BG1, respectively.

In various embodiments, a geographic trade area (e.g., geographical trade area 111) generally defines a geographic area corresponding to a physical store (e.g., physical store 160) in proximity to geographic consumer regions (e.g., geographical consumer regions 1BG1 and 1BG2). Mobile devices (e.g., mobile devices 111m1, 111m2, etc.) traveling within geographical consumer region(s) (e.g., geographical consumer regions 1BG1 and 1BG2) may be assigned or tagged with one or more geographical region descriptor(s) indicating that the user of the mobile device is a member of the geographical consumer region(s).

Provisioning server(s) and/or provisioning apps(s) 108 as described herein may determine relationships between the various geographic trade areas (e.g., geographic trade area 111) and certain geographical consumer regions (e.g., 1BG1, 1BG2, etc.). For example, in the embodiment of FIG. 2A, each of geographical trade area 111 and geographic trade area 112 may belong to an area of Seattle, as depicted by map view 200. Geographical trade area 111 and geographic trade area 112 may overlap with respect to geographical consumer region 1BG2 indicating that members of geographical consumer region 1BG2, as determined by the mobile device movement data, travel to or shop at physical stores (e.g., physical store 160) located within geographical trade area 111 and geographic trade area 112. For example, members of geographical consumer region 1BG2 may travel south on Interstate 5 across Lake Union to shop at a physical store located in geographic trade area 112. In addition, members of geographical consumer region 1BG2 may travel north on Interstate 5 to shop at a physical store located in geographic trade area 111. In addition, members of geographical consumer region 1BG2 may shop or travel within a physical store in the overlapping area of geographic trade area 111 and geographic trade area 112 as shown on map view 200. Similarly, as shown by map view 200, members of geographical consumer region 3BG1 may travel or shop within geographical trade area 111 and/or geographic trade area 113. Further, as shown by map view 200, members of geographical consumer region 4BG1 may travel or shop within geographical trade area 114 only. As shown by, map view 200, geographical trade area 114 may be a more rural area and/or may be impacted by demographics (e.g., median age under 30.0) as shown by data type key 205, where members of geographical consumer region 4BG1 may be differently economically situated than geographic trade areas 111-113 and/or may prefer only store types or stores selling products offered exclusively by geographic trade area 114.

FIG. 2B illustrates a visualization or rendering of a network store graph model 250, or data structure, representing the geographic trade areas 111-114 in relation to geographical consumer regions 1BG1, 1BG2, 2BG1, 2BG2, 3BG1, and 4BG1 of FIGS. 1 and 2, and in accordance with various embodiments disclosed herein. In various embodiments, server(s) 102 and/or provisioning app 108 may generate a network store graph model 250 as described herein. For example, as shown in FIG. 2B, network store graph model 250 may be allocated according to the one or more geographical consumer regions 1BG1, 1BG2, 2BG1, 2BG2, 3BG1, and 4BG1, where the geographical consumer regions may be grouped according to their respective geographic trade areas 111-114, all as determined from the mobile device movement data or other data as described herein. The legs of the network graph of stores may represent relationships (e.g., such as distances, attractiveness, etc.) between the geographic trade areas and consumer regions (e.g., block groups).

As shown in FIG. 2B, geographic trade areas, and their related physical stores, are represented in the network store graph model 250 as a center cluster surrounded by geographical consumer regions relative each cluster. For example, geographical trade area 111 is a cluster surrounded by, and having a relationship to several geographical consumer regions, including each of geographical consumer regions 1BG1 and 1BG2. Similarly, geographical trade area 112 is a cluster surrounded by, and having a relationship to several geographical consumer regions, including each of geographical consumer regions 2BG1 and 2BG2. Further, geographical trade areas 113 and 114 are each a cluster surrounded by, and having a relationship to several geographical consumer regions, including each of geographical consumer regions 3BG1 and 4BG1, respectively.

The relationships depicted and allocated within or for network store graph model 250 correspond to those describe herein for FIG. 2A. For example, as shown in network store graph model 250, geographical consumer region 1BG2 has a relationship with each of geographical trade area 111 and geographic trade area 112. For example, provisioning server(s) 102 and/or provisioning app 108 may access network store graph model 250 to determine that members of geographical consumer region 1BG2 travel south on Interstate 5 across Lake Union to shop at a physical store (e.g., physical store 160) located in geographic trade area 112. In addition, provisioning server(s) 102 and/or provisioning app 108 access network store graph model 250 to determine that members of geographical consumer region 1BG2 may travel north on Interstate 5 to shop at a physical store located in geographic trade area 111.

Provisioning server(s) 102 and/or provisioning app 108 may access network store graph model 250 from the geographical consumer region level or perspective or from the geographical trade area level or perspective. In this way, provisioning server(s) 102 and/or provisioning app 108 may flexibly, and efficiently, access network store graph model 250 to provide big data solutions (e.g., such as product-based recommendations, as described herein) by accessing multiple perspectives or data entry points.

In various embodiments, the network store graph model 250 may be stored or represented in memory as a light-weight and/or compiled data structure, which improves access and efficiency of provisioning server(s) 102 and/or provisioning app through its pre-defined, accessible graph. This can improve the performance of the provisioning server(s) 102 and/or provisioning app as the provisioning server(s) 102 and/or provisioning app would not need to look-up relationships already determined and embodied in the network store graph model 250.

FIG. 3 illustrates a flow diagram or algorithm of an example product provisioning and recommender method 300 for generating product-based recommendations for geographically distributed physical stores (e.g., physical store 160) based on mobile device movement (e.g., of mobile devices 111$m$1-114$m$1) in accordance with various embodiments disclosed herein.

At block 302, a server (e.g., provisioning server(s) 102)) aggregates or ingests, mobile device movement data originating from a plurality of mobile devices (e.g., mobile devices 111$m$1-114$m$1) geographically distributed with respect to a physical store, or otherwise located or situated within, a geographic trade area (e.g., geographical trade area 111).

In various embodiments, provisioning app 108 may pre-process the data to eliminate error or otherwise improve the efficiency of the generated network store graph model described herein. For example, in one embodiment, server(s) 102 may execute a preprocessing algorithm to geocode each physical store (e.g., physical store 160) with its respective latitudinal and longitudinal coordinates. In various embodiments, the coordinates may be provided by the physical stores (e.g., to servers(s) 102 from servers of the physical stores) or from third-party servers 140.

In another embodiment, server(s) 102 may execute a preprocessing algorithm to determine or obtain mobile device trips (e.g., of mobile devices, e.g., 111$m$1 to 114$m$1) to physical stores (e.g., physical store 160). Such data may be used as an approximation of "attractiveness" of a physical store or geographic trade area to a given geographical consumer region (e.g., neighborhood or block group).

In another embodiment, server(s) 102 may execute a preprocessing algorithm to clean or otherwise manipulate data for analyzing or processing by provisioning app 108. Such preprocessing may include removing duplicate data, removing store employee data (e.g., removing false positive data), and removing data of known closed store records.

At block 304, a provisioning app (app) (e.g., provisioning app 108), executing on server(s) 102 and analyzing the mobile device movement data, assigns a geographic region descriptor (e.g., 1BG2) for each mobile device of the plurality of mobile devices. Each geographic region descriptor may define a geographical consumer region (e.g., block group 1BG2) selected from one or more geographical consumer regions (e.g., 1BG1 and 1BG2) in a proximity to the geographic trade area (e.g., geographical trade area 111 and/or geographic trade area 112). Based on the various geographic region descriptors, provisioning app 108 may determine distances (e.g., drive time distances) from a given geographical consumer region (e.g., geographical consumer region 1BG2) to a physical store (e.g., physical store 160) or geographical trade area (e.g., to the center of a geographical trade area), such as geographic trade area 112.

At block 306, provisioning app 108 determines, based on the geographical region descriptors (e.g., 1BG1 to 4BG1) of the plurality of mobile devices and the geographic trade area (e.g., geographical trade area 111), a set of regional probabilities predicting a first likelihood of members of the one or more geographical consumer regions (e.g., one or more geographical consumer regions 1BG1 to 4BG1) to travel to, or shop at, the physical store (e.g., physical store 160). The determination may be made, for example, at least in part on distances and/or drive times between a given geographical consumer region and a geographical trade area (and/or center portion or physical store thereof).

Additionally or alternatively, in some embodiments, determining the set of regional probabilities may include provisioning app 108 analyzing regional data (e.g., data relating to geographic consumer regions 1BG1 to 4BG1) comprising at least one of (1) mobile device store visit data of the mobile devices traveling to the physical store, (2) demographic data of the members of the one or more geographical consumer regions, (3) psychographic data of the members of the one or more geographical consumer regions, (4) behavioral data of the members of the one or more geographical consumer regions, (5) location data of the members of the one or more geographical consumer regions. For example, regional data may include mobile device store visit data for approximately 55 million mobile devices, 40 million store visits per day, and/or demographic, psychographic, behavioral, and/or location data for 250 million consumers across 217 million geographical consumer regions (e.g., block groups or neighborhoods).

In some embodiments the regional probabilities may be determined by provisioning app 108, for example, based on Huff's gravity model. In other embodiments, the regional probabilities may be determined by a machine learning algorithm or model, for example, executing GOOGLE TENSOR FLOW, PYTORCH, or the like.

In embodiments using Huff's gravity model, provisioning app 108 via method 300 operates in a unique way, which includes applying Huff's gravity model in a dual-perspective approach, from each of a geographical consumer region level or perspective, and a geographic trade area level or perspective, and which may also include several pass algorithms to enhance probabilities and/or predictions as described herein.

For example, Huff's gravity model (H) is provided as follows:

$$P_{ij} = \frac{A_i^\beta / D_{ij}^\alpha}{\sum_{i=1}^{n} (A_i^\beta / D_{ij}^\alpha)} = H$$

In the above formula, i represents a store, j represents a neighborhood, A represents attractiveness of a store to a neighborhood, D represents distance from the store to a neighborhood, and P represents the probability of a neighborhood traveling to (or shopping at) a given store relative to all stores a neighborhood could shop.

The provisioning app 108 builds or generates multi-directional models, based on the concept of utility (which would be represented by A/D in the above formula, which generally defines utility of a store to a neighborhood). That is, method 300 may identify that the same network relationship (A/D) exists the other way: the percentage of a store's (or generally a geographic trade area's) demand may be determined in reverse for a single neighborhood.

In some embodiments, the algorithm of method 300 may be referred to as a Neighborhood Analytics (NAS) Model, which is a modification and enhancement of Huff's gravity model, and may generally be described as follows:

NAS Model=[$H_j$ to $H_i$] pass 1, $H_i$ pass 2, $H_i$ pass 3, $H_i$ pass 4 (iteratively across geographical consumer regions)

In the above model, $H_j$ to $H_i$ is a reverse, or multi-directional and iterative, application of Huff's gravity model (e.g., by provisioning app 108) from the geographical consumer region (e.g., any of one or more geographical consumer regions 1BG1 to 4BG1) perspective to geographical trade area (e.g., any of geographical trade area 111 to geographic trade area 114) to determine specific or target geographical consumer region demand or allocation. The NAS Model additionally includes, in some embodiments, the provisioning app 108 applying one or more enhancement algorithms (pass algorithms, $H_i$ pass 2, $H_i$ pass 3, $H_i$ pass 4), as further described herein, to enhance the predictive accuracy of the provision app 108 and/or network store graph model 250 as described herein. The NAS model is an iterative model which may be implemented by the provisioning app 108 to analyze, discover, and/or generate a graph network of neighborhoods and/or stores (from the perspective of each) and to iteratively account for aberrant store/neighborhood relationships. In various embodiments, provisioning app 108 may generate network store graph model 250 by implementation of the NAS model.

In some embodiments, provisioning app 108 may vary the parameters input to the NAS Model, and its corresponding Huff gravity model subparts, to generate the network store graph model 250. For example, FIG. 4 illustrates a representation of an example set of model parameters 404-412 for configuring the network store graph model 250 of FIG. 2B in accordance with various embodiments disclosed herein. Model parameters may include each of attractiveness exponent 404, distance exponent 406, probability cutoff 408, trade area test 410, and trade area size 412. Each of the model parameters 404-412 may be utilized at various stages 402 (including stages 420 to 428) of method 300 for building or generating the network store graph model 250. Stages 402 include geographical consumer region stage 420, geographic trade area stage 422, pass 2 stage 424, pass 3 stage 426, and pass 4 stage 428.

For example, with respect to block 306 of method 300, provisioning app 108 may input the attractiveness exponent 404 and distance exponent 406 parameters to determine the set of regional probabilities predicting a first likelihood of members of the one or more geographical consumer regions (e.g., one or more geographical consumer regions 1BG1 to 4BG1) to travel to, or shop at, the physical store (e.g., physical store 160). Such parameters (e.g., an attractiveness exponent of "1.3" and a distance exponent of "2") are based on the geographical region descriptors (e.g., 1BG1 to 4BG1) of the plurality of mobile devices and the geographic trade area (e.g., geographical trade area 111) at least because, in some embodiments, attractiveness and distance can be determined from the geographical region descriptors of the plurality of mobile devices and the geographic trade area(s).

In some embodiments, at block 306, provisioning app 108 may remove (at least initially) geographical consumer region records, as determined from the mobile device movement data or other data described herein, where the probability of shopping at or traveling to a store or geographic trade area is less than cutoff value. For example, as shown in FIG. 4, probability cutoff 408 includes a cutoff value for consumer region stage 420 (e.g., at block 306). Any geographical consumer region that the provisioning app 108, e.g., via NAS the model, determines has a probability of less than 1.0% would be removed (at least initially) from inclusion or generation of network store graph model 250. In some embodiments, such removed geographical consumer region(s) may be added after applying one or more of the pass algorithms (e.g., at stages 424 to 428) as described herein.

In certain embodiments, provisioning app 108 may determine, from the mobile device movement data, that certain geographical consumer region(s) and/or a geographical trade area(s) are associated with little or no trips. In such embodiments, server(s) 102 and/or provisioning app 108 may implement an attractiveness algorithm or matrix to enhance the accuracy of the network store graph model 250 to be generated at block 310. For example, FIG. 5 illustrates a representation of an example attractiveness matrix 500 for configuring the network store graph model 250 of FIG. 2B in accordance with various embodiments disclosed herein. In embodiments involving attractiveness matrix 500, provisioning app 108 may classify, based on the mobile device movement data, a physical store (e.g., physical store 160) as a low frequency store that has zero or infrequent mobile device visits. Such determination, by provisioning app 108, may cause provisioning app 108 to determine the set of regional probabilities according to attractiveness matrix 500.

For example, attractiveness matrix 500 shows various characteristics 504 to 510 across several channels 502 (including channels 520 to 528). Characteristics 504 to 510 include sales characteristic 504, price characteristic 506, distribution characteristic 508, and innovation characteristic 510. Each of these characteristics indicate an attractiveness indicator, where an "X" marker or variable, within attractiveness matrix 500, indicates an increase in attractiveness of a physical store (e.g., why people shop at given physical store) for a given channel. As shown, channels may include mass channel 520 (e.g., for chain stores), food channel 522 (e.g., for grocery stores), club channel 524 (e.g., for club/warehouse related stores), drug channel 526 (e.g., for drug stores), and dollar channel 528 (e.g., for dollar stores). For example, according to embodiment of attractive matrix 500, a low price at a food channel 522 store increases that store's attractiveness to consumers. Similarly, a club channel 524 store that provides volume sales at a discount and/or that provides monthly sales may increase that store's attractiveness to consumers, etc.

Generally, data for attractiveness matrix 500 is derived by querying sales data (e.g., point-of-sales data). Each variable may be normalized (540) over the included channels. For example, the normalizations of variables over the channels may be adjusted such that the distributions are evenly weighted (530), e.g., with an approximately 0.5 median. In addition, the average of the variables for each channel may be taken in order to determine the attractiveness value used to compute the set of regional probabilities and/or set of trade area probabilities as described herein. In some embodiments, the attractiveness coefficient of the NAS model may be scaled up (e.g., by 30 times) in order to account for certain geographical consumer region(s) and/or a geographical trade area(s) that associated with little or no trips. In this way, an attractiveness value, for use with the NAS model, may be determined and accounted for by provisioning app 108—even for stores (e.g., new stores) that are determined to be low frequency stores, that may have zero or infrequent mobile device visits as described herein.

Additionally or alternatively, provisioning app 108 may determine (e.g., at block 306) the set of regional probabilities with a machine learning model trained with regional data as described herein. In such embodiments, provisioning app 108 may include, or access via server(s) 102, regional machine learning model to determine the regional probabilities (e.g., at block 306). The regional machine learning model may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve B ayes analysis, clustering, reinforcement learning, and/or other machine learning algorithms and/or techniques. Machine learning may involve identifying and recognizing patterns in existing data (such as relationships, driving distances, driving time from the mobile device movement data or other data describe herein) in order to facilitate making predictions for subsequent data (to predict whether a first likelihood of members of one or more geographical consumer regions to travel to a physical store, e.g., physical store 160).

Machine learning model(s), such as regional machine learning model, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server(s) 102, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

For example, in some embodiments, with respect to block 306, the regional machine learning model may use regional data or other data as described herein as features to train the regional machine learning model against labels that may include known store visits as determined from the mobile device movement data. As shown at block 306, the output of regional machine learning model is the set of regional probabilities predicting a first likelihood of members of the one or more geographical consumer regions to travel to the physical store.

With respect to FIG. 3, at block 308, the provisioning app 108 determines, using the set of regional probabilities as input, a set of trade area probabilities predicting a second likelihood of members of the one or more geographical consumer regions (e.g., one or more geographical consumer regions 1BG1 to 4BG1) to travel to the physical store (e.g., physical store 160).

Additionally or alternatively, in some embodiments, determining the set of trade area probabilities may include provisioning app 108 analyzing trade area data (e.g., data relating to geographical trade areas 111-114) comprising at least one of (1) point-of-sales data of the physical store, (2) product data of one or more products of the physical store, or (3) location of the physical store.

In some embodiments the trade area probabilities may be determined by calculations, for example, based on Huff's model, by implementing the NAS model described herein. In other embodiments, the trade area probabilities may be determined by a machine learning algorithm or model, for example, executing GOOGLE TENSOR FLOW, PYTORCH, or the like.

For example, for embodiments where provisioning app 108 implements the NAS model, as shown in FIG. 4, then at geographic trade area stage 422, provisioning app 108 may input the regional probabilities of geographical consumer regions to generate a probability of each block group shopping a store (allocation). This may present a trade area probability as described herein. Such determination may use the geographic trade area stage 422 parameters ("Store TA") having an attractive exponent 404 of "1" and distance exponent 406 of "1." Such parameters are based on the regional probabilities and may therefore be represented as modified and/or updated versions of the regional probabilities.

In some embodiments, at block 308, provisioning app 108 may remove (at least initially) geographic consumer region records, as determined from the mobile device movement data or other data described herein, where the probability of shopping at or traveling to a store or geographic trade area is less than cutoff value. For example, as shown in FIG. 4, probability cutoff 408 includes a cutoff value for trade area stage 422 (e.g., at block 308). For example, any geographical consumer region that the provisioning app 108, e.g., via NAS the model, determines has a probability of less than 0.5% would be removed (at least initially) from inclusion or generation of network store graph model 250. In some embodiments, such removed geographical consumer region(s) may be added after applying one or more of the pass algorithms (e.g., at stages 424 to 428) as described herein below.

For example, with respect to FIG. 4, in various embodiments, and in implementation of the NAS model described herein, provisioning app 108 may determine that the physical store (e.g., physical store 160) is associated with a low probability value corresponding to at least one of the set of regional probabilities (e.g., of block 306) or the set of trade area probabilities (e.g., of block 208). In such embodiments, a determination, by provisioning app 108, that the low probability value falls below a threshold cutoff (e.g., probability cutoff 408) may cause the provisioning app to execute a pass algorithm or a series of pass algorithms (e.g., any one or more of pass 2 stage 424, pass 3 stage 426, and pass 4 stage 428) to classify the geographic trade area of the physical store as a large trade area, a small trade area, or a very large trade area.

Any one or more of pass 2 stage 424, pass 3 stage 426, and pass 4 stage 428 may be implemented on stores that fall below the threshold cutoff to determine whether such stores should be considered or used, nonetheless, for generation of network store graph model 250 as described further herein.

For example, pass 2 stage 424 may be executed by provision app 108 for stores situated within large trade areas. Large geographic trade areas may include geographic trade areas that serve a small number of geographical consumer regions or low population consumer regions over a wide geographic area (e.g., a rural area). For example, the threshold cutoff for a second pass algorithm ("Pass 2 Large TA") is shown as 0.5%. In addition, the "TA Test" parameter of "4<BG or pop<5000" indicates that the geographic trade area must have fewer than four consumer regions (e.g., block groups) or a total population less than 5000 members. In addition, the "TA sz" parameter indicates that the geographic trade area size must not be less than, or must be equal to, or be approximately equal to, 20 radial miles. Although specific values are provided in the example of FIG. 4 for the second pass algorithm, it is to be understood that additional and/or different values may be assigned so as to identify or classify large geographic trade areas as describe herein. In various embodiments, the provisioning app may update the network store graph model 250 with geographic trade areas identified or classified by the by the second pass algorithm.

As another example, pass 3 stage 426 may be executed by provision app 108 for stores situated within small geographic trade areas. Small geographic trade areas may include geographic trade areas that serve a small number of geographical consumer regions over a small geographic area (e.g., city or close neighborhoods). For example, the threshold cutoff for a third pass algorithm ("Pass 3 Small TA") is shown as 1.0%. In addition, the "TA Test" parameter of "4<BG" indicates that the geographic trade area must have fewer than four consumer regions (e.g., block groups). In addition, the "TA sz" parameter indicates that the geographic trade area size must not exceed, or must be equal to, or be approximately equal to, 3 radial miles. Although specific values are provided in the example of FIG. 4 for the third pass algorithm, it is to be understood that additional and/or different values may be assigned so as to identify or classify small geographic trade areas as described herein. In various embodiments, the provisioning app may update the network store graph model with geographic trade areas identified or classified by the by the third pass algorithm.

As still a further example, pass 4 stage 428 may be executed by provision app 108 for stores situated within very large trade areas. Very large geographic trade areas may include geographic trade areas that serve a very large number of geographical consumer regions over a very wide geographic area (e.g., a rural area). For example, the threshold cutoff for a fourth pass algorithm ("Pass 4 Very Large TA") is shown as the group of the top 10 lowest probabilities. In addition, the "TA Test" parameter of "4<BG" indicates that the geographic trade area must have fewer than four consumer regions (e.g., block groups). In addition, the "TA sz" parameter indicates that the geographic trade area size must not be less than, or must be equal to, or be approximately equal to, 30 radial miles. Although specific values are provided in the example of FIG. 4 for the fourth pass algorithm, it is to be understood that additional and/or different values may be assigned so as to identify or classify very large geographic trade areas as described herein. In various embodiments, the provisioning app may update the network store graph model with geographic trade areas identified or classified by the by the fourth pass algorithm.

Additionally or alternatively, provisioning app 108 may determine (e.g., at block 308) the set of trade area probabilities with a machine learning model trained with the trade area data, as described herein. In such embodiments, provisioning app 108 may include, or access via server(s) 102, a trade area machine learning model to determine the set of trade area probabilities (e.g., at block 306).

For example, in some embodiments, with respect to block 308, the trade area machine learning model may use trade area data or other data as described herein, as features to train the trade area machine learning model against labels that may include set(s) of regional probabilities as inputs. As described for block 308, the output of trade area machine learning model is the set of trade area probabilities predicting a second likelihood of members of the one or more geographical consumer regions to travel to the physical store.

At block 310, provisioning app 108 generates, based on the set of regional probabilities and the set of trade area probabilities, a network store graph model (e.g., network store graph model 250), which may be allocated according to the one or more geographical consumer regions (e.g., any of one or more geographical consumer regions 1BG1 to 4BG1). In this way, method 300, via provision app 108, generates a multi-perspective model (e.g., a network store graph model 250, as described herein) based on mobile device movement tracking and data, which can include, for example, 40 million mobile device data received or generated per day. The network store graph model 250 is accessible via multiple perspectives by providing a dual perspective or view by allowing analysis or access of allocation and/or demand from both the consumer region (e.g., block group) perspective and the trade area (e.g., physical store) perspective.

In some embodiments, network store graph model 250 may be generated as an allocation file having a homogenous data structure operable to be organized by the one or more geographical consumer regions (e.g., any of one or more geographical consumer regions 1BG1 to 4BG1). For example, in one embodiment, all store and block group data may be aggregated into a data structure or file for quick and/or structured access. In some embodiments, server(s)

102 and/or provision app 108 may be configured to render or otherwise visualize the network store graph model via a guided user interface (GUI).

With respect to FIG. 3, at block 312, provisioning app 108 generates, based on network store graph model 250, a product-based recommendation for a target geographic consumer region (e.g., geographic consumer region 1BG2) selected from the one or more geographical consumer regions (e.g., any of one or more geographical consumer regions 1BG1 to 4BG1) and in a proximity to the geographic trade area (e.g., geographical trade area 111 or geographic trade area 112). In various embodiments, the product-based recommendation is provided to an operator of the physical store or a product manufacturer. In some embodiments, the product-based recommendation may be provided via computer network 120, for example, to a server (e.g., server(s) 150) or other computing device operated or controlled by the operator of the physical store (e.g., physical store 160) and/or product manufacturer (e.g., product manufacturer 170).

In some embodiments, the product-based recommendation is a product development recommendation including characteristics of a new product identified for the target geographic consumer region. For example, the product development recommendation may inform a product manufacturer (e.g., product manufacturer 170) about what products to produce with certain characteristics for a target geographic consumer region or regions.

In other embodiments, the product-based recommendation may be a product recommendation specific to the physical store (e.g., physical store 160) and for the target geographic consumer region (e.g., geographic consumer region 1BG2). In some embodiments, products may be consumer products such as consumer packaged goods (CPG). For example, the product-based recommendation may include a supply status recommendation (e.g., restock existing product) or a new product recommendation for the physical store to stock a new product based on the probabilities determined from the target geographic consumer region.

In further embodiments, the product-based recommendation may be a product marketing recommendation including a suggested marketing promotional for consumers of target geographic consumer region. Such a product-based recommendation may allow a physical store operator or product manufacturer to target specific neighborhoods for marketing. The marketing may include, for example, electronic marketing (e.g., social media marketing, email marketing, or the like) and/or mail marketing, etc. for a specific product, etc.

In various embodiments, method 300 may determine probabilities and/or generate network store graph models(s) based on considering multiple geographic trade areas. In such embodiments, provisioning server(s) 102 may further be configured to aggregate the mobile device movement data originating from the plurality of mobile devices geographically distributed with respect to a second physical store of a second geographic trade area (e.g., geographic trade area 112). In some embodiments, geographic trade areas may overlap (e.g., geographical trade area 111 and geographic trade area 112). In other embodiments, geographic trade areas may be different and not overlap (e.g., geographical trade area 111 and geographic trade area 114). In such embodiments, the provisioning app 108 may further be configured to determine, based on the geographical region descriptors (e.g., any of 1BG1 to 4BG1) of the plurality of mobile devices (e.g., mobile devices 111m1, etc.) and the second geographic trade area (e.g., geographic trade area 112), a second set of regional probabilities predicting the likelihood of members of the one or more geographical consumer regions to travel to the second physical store.

In such embodiments, each of the set of regional probabilities (e.g., for the first physical store) and the second set of regional probabilities (e.g., for the second physical store) may be normalized or scaled relative to one another. For example, the probabilities are scaled so that the sum of the probabilities equal 100%.

In addition, provisioning app 108 may determine, using the second set of regional probabilities as input, a second set of trade area probabilities predicting the likelihood of members of the one or more geographical consumer regions to travel to the second physical store.

In such embodiments, the network store graph model 250 may be generated based on each of the set of regional probabilities as normalized, the second set of regional probabilities as normalized, the set of trade area probabilities, and the second set of trade area probabilities. In such embodiment, the network store graph model 250 is enhanced by the further probabilities, including as normalized, thereby increasing the predictive accuracy of the provisioning server(s) 102 and/or provisioning app 108.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A product provisioning and recommender system for generating product-based recommendations for geographically distributed physical stores based on mobile device movement, the product provisioning and recommender system comprising:

a server configured to aggregate mobile device movement data originating from a plurality of mobile devices geographically distributed with respect to a physical store of a geographic trade area, the mobile device movement data captured in real-time by tracking GPS data of the plurality of mobile devices; and a provisioning application (app), executing on the server, and configured to analyze the mobile device movement data to:

assign, based on the mobile device movement data, a geographic region descriptor for each mobile device of the plurality of mobile devices, each geographic region descriptor defining a geographical consumer region selected from one or more geographical consumer regions in a proximity to the geographic trade area, determine, based on the geographical region descriptors of the plurality of mobile devices and the geographic trade area, a set of regional probabilities predicting a first likelihood of members of the one or more geographical consumer regions to travel to the physical store, determine, using the set of regional probabilities as input, a set of trade area probabilities predicting a second likelihood of members of the one or more geographical consumer regions to travel to the physical store, generate, based on the set of regional probabilities and the set of trade area probabilities, a multi-directional graph model allocated according to the one or more geographical consumer regions, wherein the multi-directional graph model is stored as a predefined data structure accessible via a look-up application programming interface (API), which improves access to and efficiency of the server by reducing computing through use of the multi-directional graph model thereby conserving memory and processor resources, and generate, based on the multi-directional graph model, a product-based recommendation for a target geographic consumer region selected from the one or more geographical consumer regions and in a proximity to the geographic trade area, wherein the product-based recommendation is provided to an operator of the physical store or a product manufacturer wherein the server is further configured to aggregate the mobile device movement data originating from the plurality of mobile devices geographically distributed with respect to a second physical store of a second geographic trade area, and wherein the provisioning app is further configured to:

determine, based on the geographical region descriptors of the plurality of mobile devices and the second geographic trade area, a second set of regional probabilities predicting the likelihood of members of the one or more geographical consumer regions to travel to the second physical store, wherein each of the set of regional probabilities and the second set of regional probabilities are normalized relative to one another, determine, using the second set of regional probabilities as input, a second set of trade area probabilities predicting the likelihood of members of the one or more geographical consumer regions to travel to the second physical store, and wherein the multi-directional graph model is generated based on each of the set of regional probabilities as normalized, the second set of regional probabilities as normalized, the set of trade area probabilities, and the second set of trade area probabilities.

2. A product provisioning and recommender system for generating product-based recommendations for geographically distributed physical stores based on mobile device movement, the product provisioning and recommender system comprising:

a server configured to aggregate mobile device movement data originating from a plurality of mobile devices geographically distributed with respect to a physical store of a geographic trade area, the mobile device movement data captured in real-time by tracking GPS data of the plurality of mobile devices; and a provisioning application (app), executing on the server, and configured to analyze the mobile device movement data to:

assign, based on the mobile device movement data, a geographic region descriptor for each mobile device of the plurality of mobile devices, each geographic region descriptor defining a geographical consumer region selected from one or more geographical consumer regions in a proximity to the geographic trade area, determine, based on the geographical region descriptors of the plurality of mobile devices and the geographic trade area, a set of regional probabilities predicting a first likelihood of members of the one or more geographical consumer regions to travel to the physical store, determine, using the set of regional probabilities as input, a set of trade area probabilities predicting a second likelihood of members of the one or more geographical consumer regions to travel to the physical store, generate, based on the set of regional probabilities and the set of trade area probabilities, a multi-directional graph model allocated according to the one or more geographical consumer regions, wherein the multi-directional graph model is stored as a predefined data structure accessible via a look-up application programming interface (API), which improves access to and efficiency of the server by reducing computing through use of the multi-directional graph model thereby conserving memory and processor resources, and generate, based on the multi-directional graph model, a product-based recommendation for a target geographic consumer region selected from the one or more geographical consumer regions and in a proximity to the geographic trade area, wherein the product-based recommendation is provided to an operator of the physical store or a product manufacturer wherein the provisioning app determines that the physical store is associated with a low probability value corresponding to at least one of the set of regional probabilities or the set of trade area probabilities, wherein a determination, by the provisioning app, that the low probability value falls below a threshold cutoff causes the provisioning app to execute a pass algorithm or a series of pass algorithms to classify the geographic trade area of the physical store as a large trade area, a small trade area, or a very large trade area.

3. A product provisioning and recommender method for generating product-based recommendations for geographically distributed physical stores based on mobile device movement, the product provisioning and recommender method comprising:

aggregating, by a server, mobile device movement data originating from a plurality of mobile devices geographically distributed with respect to a physical store of a geographic trade area, the mobile device movement data captured in real-time by tracking GPS data of the plurality of mobile devices;

assigning, by a provisioning application (app) executing on the server and analyzing the mobile device movement data, a geographic region descriptor for each mobile device of the plurality of mobile devices, each geographic region descriptor defining a geographical consumer region selected from one or more geographical consumer regions in a proximity to the geographic trade area;

determining, by the provisioning app based on the geographical region descriptors of the plurality of mobile devices and the geographic trade area, a set of regional probabilities predicting a first likelihood of members of the one or more geographical consumer regions to travel to the physical store;

determining, by the provisioning app using the set of regional probabilities as input, a set of trade area probabilities predicting a second likelihood of members of the one or more geographical consumer regions to travel to the physical store;

generating, by the provisioning app based on the set of regional probabilities and the set of trade area probabilities, a multi-directional graph model allocated according to the one or more geographical consumer regions, wherein the multi-directional graph model is stored as a predefined data structure accessible via a look-up application programming interface (API), which improves access to and efficiency of the server by reducing computing through use of the multi-directional graph model thereby conserving memory and processor resources; and generating, by the provisioning app based on the multi-directional graph model, a product-based recommendation for a target geographic consumer region selected from the one or more geographical consumer regions and in a proximity to the geographic trade area, wherein the product-based recommendation is provided to an operator of the physical store or a product manufacturer by the automated platform;

wherein the provisioning app determines that the physical store is associated with a low probability value corresponding to at least one of the set of regional probabilities or the set of trade area probabilities, wherein a determination, by the provisioning app, that the low probability value falls below a threshold cutoff causes the provisioning app to execute a pass algorithm or a series of pass algorithms to classify the geographic trade area of the physical store as a large trade area, a small trade area, or a very large trade area.

* * * * *